Patented May 7, 1935

2,000,878

UNITED STATES PATENT OFFICE 2,000,878

ACETIC ACID

Edgar C. Britton, Howard S. Nutting, and Myron E. Huscher, Midland, Mich., assignors to The Dow Chemical Company, Midland, Mich., a corporation of Michigan No Drawing. Application December 6, 1933, Serial No. 701,182

8 Claims. (Cl. 260—116)

This invention concerns a method of making alkali metal acetate or acetic acid from propylene.

It is known that ethylene can be reacted with aqueous alkali metal hydroxide under pressure at high temperatures to produce alkali metal acetate.

From this fact it would be expected that the reaction of propylene under similar conditions would lead to the production of alkali metal propionate. We have found, however, that by reacting propylene with aqueous alkali metal hydroxide, alkali metal acetate is produced as the principal product, very little if any propionate being formed. Such reaction of propylene is represented by the equation:—

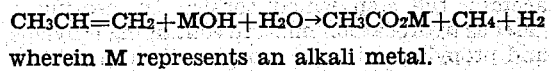

wherein M represents an alkali metal.

We have further found that basic aluminum compounds, e. g. aluminum oxide, aluminum hydroxide, sodium or potassium aluminate, etc., catalyze such reaction of propylene with aqueous alkali metal hydroxide.

The invention, then, consists in the method of making acetate or acetic acid hereinafter fully described and particularly pointed out in the claims, the following description and example setting forth in detail only certain of the various ways in which the principle of our invention may be employed.

An autoclave is partially filled with an aqueous alkali metal hydroxide solution having a concentration of less than 40 per cent, preferably from 3 to 20 per cent. A basic aluminum compound, e. g. aluminum oxide, aluminum hydroxide, sodium aluminate, etc., is preferably, though not necessarily, dissolved in or intermixed with the alkaline solution as a reaction catalyst. The basic aluminum compound may be added as such to the alkaline solution or formed therein by adding an aluminum salt, e. g. aluminum chloride, aluminum nitrate, aluminum carbonate, etc. The basic aluminum compound may be employed in any desired proportion, but usually about 0.3 of the chemical equivalent of the alkali metal hydroxide used is sufficient.

Propylene or a hydrocarbon mixture containing propylene is then charged into the autoclave, preferably until the latter contains propylene in approximately equimolecular amount to the alkali metal hydroxide present, although any desired proportion of propylene may be employed. After the propylene has been charged into the autoclave, the latter is sealed and the charge therein is heated with stirring to a temperature between 300° and 420° C., preferably between 350° and 390° C., usually for from 1 to 10 hours.

The autoclave is then cooled, gas is released therefrom, and the liquid reaction mixture is removed. The liquid reaction mixture is concentrated by evaporation, during which operation certain organic by-products, e. g. isopropyl alcohol and polymers of propylene, are vaporized from the mixture and recovered in the condensed vapors, leaving an alkaline solution of relatively pure alkali metal acetate. If desired, the liquid mixture may be concentrated sufficiently to crystallize a portion of the alkali metal acetate product, the crystalline product being separated from its alkaline mother liquor, and the latter reemployed for the oxidation of additional quantities of propylene. When operating on a small scale, however, we find it most convenient to acidify the concentrated liquor with mineral acid, e. g. sulphuric or hydrochloric acid, and to separate acetic acid from the acidified liquor by distillation.

The following example illustrates one way in which the principle of our invention has been applied, but is not to be construed as limiting the invention.

Example 79.3 grams of a 24.1 per cent aqueous potassium hydroxide solution (containing 0.342 mole of KOH) and 2 grams of aluminum oxide were placed in an iron bomb, and 18.1 grams (0.431 mole) of propylene was then charged into the bomb, which was then sealed. The reaction mixture was heated with agitation to 365° C. in about 2 hours, after which it was maintained at between 365° and 376° C. with continued agitation for 8.5 hours. The bomb was then cooled, gas released therefrom, and the liquid reaction mixture was removed. Water and certain organic by-products, e. g. isopropyl alcohol and polymers of propylene, were distilled from the liquid mixture to leave a concentrated alkaline solution of potassium acetate. The distillate was analyzed and found to contain approximately 1 gram of isopropyl alcohol and 3.5 grams of liquid polymers of propylene. The concentrated acetate solution remaining after the above mentioned distillation was acidified with sulphuric acid and aqueous acetic acid was distilled from the acidified liquor. There was obtained 0.105 mole of acetic acid, the yield thereof being 30.6 per cent of theoretical, based on the quantity of potassium hydroxide used.

While we prefer to carry out the reaction of propylene with an aqueous alkali metal hydroxide in the presence of a basic aluminum compound as catalyst, since the reaction proceeds most smoothly and rapidly when such catalyst is used, we have produced alkali metal acetate by heating propylene under pressure with aqueous sodium hydroxide and with aqueous potassium hydroxide in the absence of such catalyst.

Instead of employing pure propylene in our process, a mixture of propylene with other gaseous or liquid hydrocarbons may be employed. For instance, when oil gas containing a mixture of ethylene, propylene, and higher olefines is reacted with aqueous alkali metal hydroxide under the conditions hereinbefore described, ethylene and propylene are both converted into alkali metal acetate, whereas the higher olefines either remain substantially unreacted or are polymerized. The alkali metal acetate or acetic acid product can readily be separated from the reacted mixture by procedure hereinbefore described.

The expression "acetate product", where employed in the claims, refers to a product selected from the class consisting of acetic acid and salts thereof.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises reacting propylene with an aqueous alkali metal hydroxide solution, and thereafter separating an acetate product from the reacted mixture.

2. The method which comprises heating propylene with an aqueous alkali metal hydroxide solution under pressure to a temperature between about 300° C. and about 420° C., and thereafter separating an acetate product from the reacted mixture.

3. In a method of making an alkali metal acetate, the step which consists in heating propylene with an aqueous alkali metal hydroxide solution in the presence of an inorganic basic aluminum compound under pressure to a temperature between about 300° C. and about 420° C.

4. In a method of making an alkali metal acetate, the step which consists in heating propylene with an aqueous alkali metal hydroxide solution of less than 40 per cent concentration in the presence of an inorganic basic aluminum compound under pressure to a temperature between about 350° C. and about 390° C.

5. In a method of making an alkali metal acetate, the steps which consist in heating propylene with an aqueous alkali metal hydroxide solution of not more than 20 per cent concentration in the presence of an inorganic basic aluminum compound under pressure to a temperature between about 350° C. and about 390° C., concentrating the reacted liquor sufficiently to crystallize alkali metal acetate therefrom, and separating the crystalline product.

6. In a method of making acetic acid, the steps which consist in heating propylene with an aqueous alkali metal hydroxide solution of less than 20 per cent concentration in the presence of an inorganic basic aluminum compound under pressure to a temperature between about 350° C. and about 390° C., acidifying the reacted liquor with mineral acid, and distilling acetic acid from the acidified liquor.

7. The method which comprises heating a hydrocarbon mixture containing propylene with an aqueous alkali metal hydroxide solution under pressure to a temperature between about 300° C. and about 420° C., and thereafter separating an acetate product from the reacted mixture.

8. In a method of making an alkali metal acetate, the step which consists in heating a gaseous hydrocarbon mixture containing ethylene and propylene with an aqueous alkali metal hydroxide solution in the presence of an inorganic basic aluminum compound under pressure to a temperature between about 350° C. and about 390° C., whereby ethylene and propylene both react to form alkali metal acetate.

EDGAR C. BRITTON.
HOWARD S. NUTTING.
MYRON E. HUSCHER.